United States Patent
Bruzzi et al.

(10) Patent No.: US 8,094,081 B1
(45) Date of Patent: Jan. 10, 2012

(54) DUAL BAND RADIO FREQUENCY (RF) AND OPTICAL COMMUNICATIONS ANTENNA AND TERMINAL DESIGN METHODOLOGY AND IMPLEMENTATION

(75) Inventors: Jonathan R. Bruzzi, Silver Spring, MD (US); Bradley G. Boone, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 1057 days.

(21) Appl. No.: 11/923,800

(22) Filed: Oct. 25, 2007

(51) Int. Cl.
*H01Q 21/00* (2006.01)

(52) U.S. Cl. .................. 343/725; 343/783; 343/781 P; 343/781 CA; 343/786; 343/911; 343/753; 343/756; 343/909

(58) Field of Classification Search .............. 343/783, 343/781 P, 781 CA, 786, 753, 756, 725, 909, 343/911 R
See application file for complete search history.

(56) References Cited

U.S. PATENT DOCUMENTS

| | | | |
|---|---|---|---|
| 4,282,527 A | 8/1981 | Winderman et al. | |
| 4,477,814 A | 10/1984 | Brumbaugh et al. | |
| 4,866,454 A | 9/1989 | Droessler et al. | |
| 5,089,828 A * | 2/1992 | Moss | 343/725 |
| 5,214,438 A | 5/1993 | Brusgard et al. | |
| 5,298,909 A | 3/1994 | Peters et al. | |
| 5,327,149 A | 7/1994 | Kuffer | |
| 6,307,521 B1 | 10/2001 | Schindler et al. | |
| 6,445,351 B1 * | 9/2002 | Baker et al. | 343/725 |
| 6,587,699 B2 | 7/2003 | Olsen et al. | |
| 6,611,696 B2 | 8/2003 | Cheddester et al. | |

FOREIGN PATENT DOCUMENTS

| | | |
|---|---|---|
| JP | 61178682 | 8/1986 |
| JP | 62000879 | 1/1987 |

* cited by examiner

*Primary Examiner* — Dieu H Duong
(74) *Attorney, Agent, or Firm* — Aisha Ahmad

(57) ABSTRACT

A dual-band antenna is provided that combines two normally disparate communications modes into a single compact aperture minimizing overall mass and volume, while maintaining high performance efficiency and reciprocity of each individual mode. The antenna is compatible with both optical (near-IR/visible) and RF (microwave/millimeter-wave) transceiver subsystems for high bandwidth communications, applicable primarily to long- to extremely long-range (space-to-ground) link distances. The optical link provides high bandwidth while the RF provides a lower data-rate weather backup, accommodation for traditional navigation techniques, and assistance in cueing the extremely tight optical beam by matching the RF beamwidth to an optical fine-steering mechanism field-of-regard. The configuration is built around a near-diffraction-limited high performance primary mirror shared by both a direct-fed RF antenna design and a Cassegrain optical telescope. Material properties are exploited to combine the optical secondary mirror with the RF feed structure, providing a collimated optical beam interface at the antenna vertex.

21 Claims, 7 Drawing Sheets

DUAL BAND RADIO FREQUENCY (RF) AND OPTICAL COMMUNICATIONS ANTENNA AND TERMINAL DESIGN METHODOLOGY AND IMPLEMENTATION

BACKGROUND OF THE INVENTION

1. Field of the Invention

The present invention relates generally to antennas and more particularly to a dual-band, RF and optical antenna with a shared aperture for optical as well as microwave communications using a single compact and highly efficient structure. The present invention also relates to the optimal communication system attributes that drive the antenna design, the RF and optical mode control logic, and the multi-channel receiver implementation that collectively support optimal operation under limited availability conditions from space to ground.

2. Description of the Related Art

There is increasing need for very high data rate communications for critical data transfer and command-control-communication systems for military reconnaissance and situational awareness from space. It is also desirable to be able to project this data directly to one or more users in a specific theater, as opposed to routing the data through Continental United States (CONUS) operations centers. The scientific community also requires progressively higher science data returns from its space missions. Toward the goal of maximizing data transfer rates, as well as total data throughput, it is reasonable to capitalize on the enormous bandwidths optical communications technology offers in order to support these missions. To compensate, however, for link losses and availability from space platforms directly to ground sites, dual-band (optical/RF) technologies are desirable because optical link availabilities even with site diversity are problematic. Microwave systems may have less bandwidth, but can serve as backups to the higher-gain optical link under adverse weather conditions. Combining the front-end apertures of each communication regime, specifically optical and RF, into a single joint terminal can save valuable platform real-estate, particularly for mass and volume constrained spacecraft.

Challenges posed by such merged (i.e., optical/RF) designs include accommodating the disparate nature of the two design regimes and the competing requirements for the highly precise optical surface quality components and the low mass necessary for space platforms. Conventionally, the design regimes (aperture diameters) for free-space optical communications and RF communications links have been somewhat dissimilar. Terrestrial laser links have been demonstrated over ranges of up to 10s of kilometers and require only a few inches of optical aperture due to the small amount of diffraction-induced beam spreading at optical wavelengths. RF apertures, on the other hand, are necessarily larger at microwave and millimeter-wave wavelengths to provide the desired gain despite being over a larger solid angle (beamwidth) relative to optical beams. Optical reflectors (mirrors) are also typically flatter (i.e., having higher f/#) than RF reflectors of similar size due to the difficulty of fabricating highly precise curved surfaces over large diameters. In turn, Cassegrain configurations are used to fold the optical path in order to make the design more compact. However, Cassegrain layouts at microwave frequencies for such relatively small apertures, in RF terms, are not practical. Therefore, a direct-fed RF design is desired which functions in conjunction with the Cassegrain optical design.

SUMMARY OF THE INVENTION

The present invention provides a dual-band (optical/RF) antenna with a single shared, high-precision (mirror quality) aperture for optical and RF communications using a lightweight structure to minimize mass and volume, while maintaining the high performance efficiency of each individual mode. The novel antenna design is reciprocal in both regimes, accommodating transmission and reception of both optical and radio frequency energies with maximum efficiency (near diffraction-limited performance). The optical mode provides a high bandwidth extremely directive optical link, while the RF mode provides a lower bandwidth wider beam link, well suited for maintaining connectivity during adverse weather conditions, such as clouds. The RF band also accommodates traditional navigation techniques, and assists in cueing the extremely tight optical beam. The antenna is well-suited for far-range (e.g., >100 km terrestrial) to extremely far-range (space-to-ground) link distances.

According to one aspect of the present invention, the dual-band (optical/RF) antenna design is reciprocal in both regimes, enabling both transmission and reception at RF frequencies (Ku/Ka-band and above) as well as visible or Near-IR optical wavelengths (400-1550 nm).

According to another aspect of the present invention, the dual-band (optical/RF) antenna is built around a near-diffraction-limited high performance primary mirror which is shared by both the direct-fed (prime-focus) RF antenna design and a Cassegrain optical telescope. The dual-band antenna provides a collimated optical beam interface at its vertex to allow straightforward integration with an optical transceiver to be situated behind the primary mirror, i.e., the Cassegrain acts like an afocal telephoto/beam expander. The optical portion of a typical laser communications (lasercom) transceiver would necessarily consist of a radiating source, optical interface and distribution train, and a fast-steering loop, all mounted on a vibration isolated mini-optical bench with adequate heat dissipation for the laser. A particular transceiver configuration of note which the high precision aperture enables is one which achieves fiber-coupling of the received optical beam using adaptive optics behind the primary mirror.

According to yet another aspect of the invention, for optimal utility, the RF and optical designs are matched to allow RF cueing and acquisition of the optical communications beam using the microwave system, i.e., the field-of-regard (FOR) of the optical fine-steering mechanism encompasses or is less than the main RF beamwidth.

According to one aspect, the disclosed dual-band antenna exploits material properties to allow the two modes of operation to be co-boresighted while using a direct feed system for the RF and a Cassegrain system for the optics. The combination of a co-boresighted optical imaging-quality aperture, applicable to a variety of desirable functions (i.e., communications, imaging, sensing) with an RF communications and/or sensing aperture, achieves both link robustness and enhanced systems capabilities.

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION OF THE PREFERRED EMBODIMENTS

1. Introduction

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

2. Overview

The combination of both optical and RF communications bands into a single optimized, compact system design aperture realizes a highly capable and efficient communications terminal in terms of mass, power, and performance.

The invention allows for simultaneous pointing/gimballing of both bands, robustness in terms of RF navigation and weather backup capabilities, and simple optical beam acquisition by way of the complementary RF design.

The dual-band (optical/RF) antenna of the invention has general applicability to free-space communications, but is particularly well-suited for links requiring very long distances and high performance efficiency, such as those from space-to-space or space-to-ground.

As will become apparent, advantages of the present invention include robustness for communications, and potential to spin-off to multi-band sensors, such as (dual-band) lidar and radar. In addition to those applications that may utilize the present invention for communications, it is also contemplated to use the present invention for passive sensing applications in that the invention provides considerable reduction in mass, as well as structural and functional complexity, especially for smaller spacecraft platforms. By utilizing an optical quality primary mirror as an indispensable part of the antenna, long standoff-range optical imaging from the spacecraft comms terminal is possible, which can then be downlinked to a nearly co-located ground terminal with a co-boresighted RF downlink (and uplink) achievable through the same co-boresighted aperture.

3. Design Process

Figure 1:
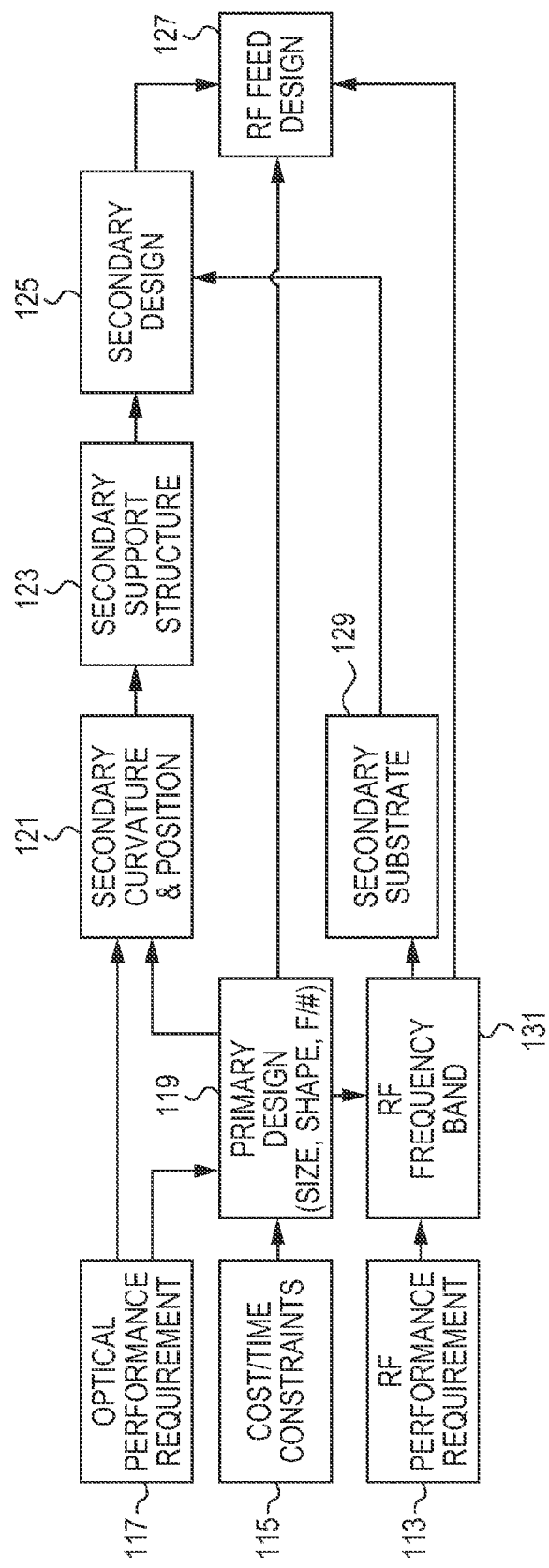
FIG. 1 is a block diagram describing the design flow, which enables the dual-band antenna optimal design and capability, according to one embodiment of the invention.

Referring now to FIG. 1, there is shown major aspects of the dual-band antenna design flow, according to one embodiment. The same design methodology is applicable to other embodiments, including an off-axis design with the RF feedhorn offset oppositely to the optical secondary (with respect to the primary mirror) to eliminate the dichroic nature of the secondary. A design with both the optical source and RF feed located at the focus of the primary may also be envisioned, the optimal design for the communications bands of interest, however, is that which utilizes a Cassegrain geometry for the optics and a prime-focus design for the microwave.

The design flow for the Cassegrain design begins with the optical and RF performance requirements 117 & 113. This embodiment is the simplest from an optical design perspective and is symmetric for both the RF and optical channels, which obviates any misalignments between the two, which is particularly important for long range links. The performance requirements, along with the cost and time constraints 115, dictate the primary mirror's acceptable range of size and shape 119. Since the optical regime is much more likely to limit the size of the primary reflector, this also puts a restriction on the lower end of the RF frequency band 131 which is practical. The primary mirror selection also dictates the optical secondary curvature and position 121, with the substrate material 129 being constrained to those which can accommodate RF transmission with manageable effect. The secondary surface 121 must also accommodate RF transmission while maintaining high optical reflectivity. The secondary must also be supported at the appropriate position relative to the primary with an RF transparent supporting structure 123. The substrate, coating, geometry, and support structure encompass the optical secondary design 125 as a whole. The primary reflector design 119 and optical secondary characteristics 125, along with the secondary substrate material characteristics 129, must be accounted for in the RF feed horn design 127. An iterative process optimizes performance in both communications bands (RF and optical).

The main challenge to designing the antenna for efficient operation in both bands (optical/RF) stems from the inherent difference in f-number (f/#) used in each independent design. Optical telescopes typically use f/#'s high since optical quality primary mirrors (surface accuracy better than one quarter the operating wavelength) are extremely difficult to manufacture having a large amount of surface curvature. This causes the optical design to have a relatively long focus. In Cassegrain designs, a secondary mirror is used to bend the optical path back to a focus behind the primary mirror, thus limiting the overall size of the telescope. The Cassegrain design also limits the effective FOV of the optical design, but this is acceptable for communications applications. Conversely, RF antenna designs typically use lower f/#s, since the surface quality requirement is much reduced from that of optical designs. The faster curvature and shorter focus allows the RF design to be more compact, and also lends itself to the use of smaller feeds for illuminating the primary reflector effectively, while limiting the amount of blockage incurred by the collimated beam.

Therefore, once a primary size and shape is chosen, the optical system may be designed and simulated to limit blockage and maximize the optical performance using ray-tracing or physical optics design software (e.g., ZEMAX). The primary/secondary combination effectively limits the lower end of the RF frequency band that is still practical for the Cassegrain optical/direct-fed RF configuration. The higher the f/#, the more directive the RF feed needs to be to effectively illuminate the primary reflector when positioned at the focus of the primary. This typically requires the RF feed horn (as an example of one type of feed) to grow in size, which at a low RF frequency, may be larger than the desired diameter of the optical secondary. Therefore, a high enough RF frequency must be chosen to allow the RF feed to sit behind the optical secondary while optimally illuminating the primary reflector, i.e., proper phase-front and ~10 dB beamwidth positioned at the primary edges.

The RF feed design must include the effects of the optical secondary substrate material, which is chosen to have the required structural, optical surfacing, and RF transmissive properties. While being RF transmissive, the secondary substrate can still be expected to lens the pattern of the RF feed horn and therefore must be included in the design process, perhaps using an electromagnetic structure simulation package (such as Ansoft's High Frequency Structure Simulator, HFSS).

The overall RF performance may be simulated by incorporating the combined feed simulation into a dish antenna design simulation (using, for example, Ohio State University's basic scattering code, NECBSC or Reflector-Code software), which may also include the effect of the struts supporting the secondary/RF feed combination. The RF transmissive support structure and baffle may also be incorporated into the RF feed and/or system simulation, or empirical tests may be performed to iterate the RF feed design.

Figure 2:
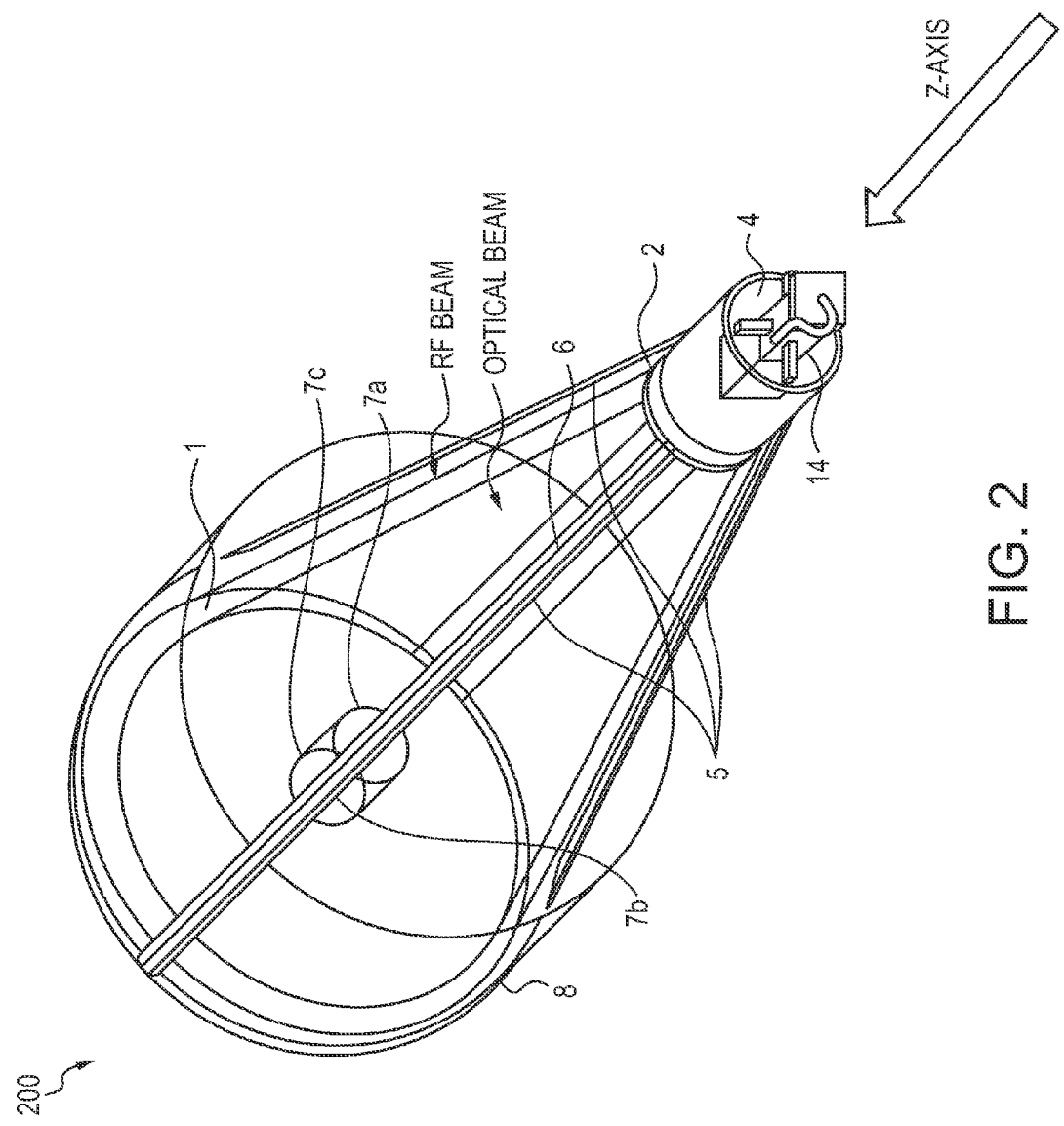
FIG. 2 is a perspective view of a dual-band antenna, according to one embodiment of the invention.

A typical design process for the combined RF feed/optical secondary may be executed as follows:
a. Assume an appropriate primary and secondary geometry (paraboloid/hyperboloid or spherical/oblate ellipsoid, etc.)
b. Design the optical configuration including primary and secondary geometry and possible divergent lens at vertex
c. Design an RF horn for prime focus to unobstructed primary
d. Determine the secondary substrate material and appropriate starting point for thickness, e.g., half the guide wavelength ($\lambda_{guide}/2$) in the material
e. Simulate the substrate with a frequency-selective surface (FSS) or a continuous dielectric coating to optimize the thickness for RF transmission
f. Simulate RF horn pattern with secondary substrate functioning as RF lens
g. Redesign horn for proper primary illumination (including secondary substrate effects)
h. Design structure to support secondary, displaced in front of the horn
i. Design independent precision alignment adjustments for both the horn and secondary surface FIG. 2 shows a perspective view of a dual-band (optical/RF) antenna 200, according to one embodiment. The microwave/mm-wave and optical designs are co-boresighted, co-axial (along the Z-axis), and share a common primary reflector 1. A three-strut support structure 5 suspends a secondary mirror substrate/RF lens combination 2 and RF feed horn 14 in the vicinity of the focus of the parabolic primary mirror 1. RF feed horn 14 of FIG. 2 is used to directly illuminate and receive microwave/mm-wave energy from the primary reflector 1. The RF feed horn 14 is fed through the RF feed cable 6 and is designed in conjunction with the secondary mirror/RF lens combination 2, which slightly lenses the RF feed horn radiation pattern. An RF-transmissive baffle 7a is used to limit stray light from passing through the primary vertex (7b), while minimizing the effect on the RF radiation pattern. An optically transparent/RF reflective window 7c (i.e.—Indium-Tin-Oxide, ITO coating) may be used to seal the vertex 7b, if necessary. An RF-transmissive shroud 8 may also be used to limit the amount of direct solar illumination the primary mirror 1 may experience during operations.

Figure 3:
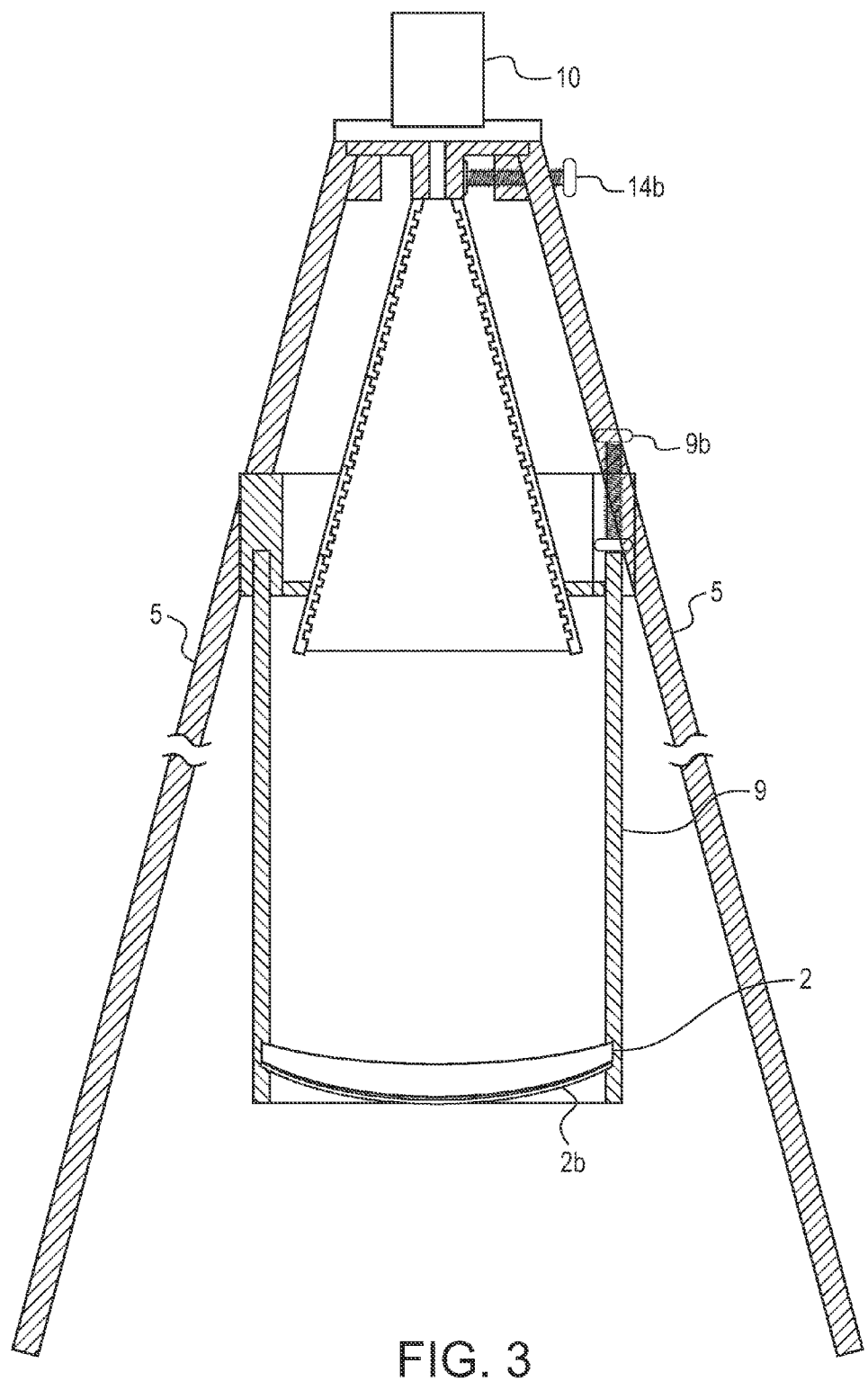
FIG. 3 is a more detailed view of the combined secondary/feed element of the dual-band antenna of FIG. 2, according to one embodiment of the invention.

Referring now to FIG. 3, there is shown a more detailed plan view of the optical secondary/RF feed combination.

The RF portion of the secondary/RF feed combination is shown to consist of a radiating horn antenna (shown as an internally corrugated horn) 14 and a circular polarizer 10, fed by a low-loss RF cable 6 (see FIG. 1), or waveguide, integrated with one of the three supporting struts 5 (see FIG. 1). The secondary substrate/RF lens 2 is shown displaced in front of the aperture of the RF horn 14. An optical transceiver (not shown) would be positioned behind the primary 1 (see FIG. 1) and would interface to the aperture of the dual-band (optical/RF) antenna 200 via a collimated optical beam. A divergent lens (not visible) at the vertex of the antenna assembly is used to relay the optical beam to the front surface of the secondary mirror substrate/RF lens which is coated with an optically-reflective dielectric coating (2b), which in turn illuminates the whole of the primary mirror 1. The primary mirror 1 reflects the optical beam which is then transmitted outward. Likewise, an incoming beam encompassing the aperture is reflected by the primary mirror 1 to the secondary mirror 2b and ultimately to the divergent lens situated at the vertex of the assembly, for transfer to an optical transceiver (not shown).

With continued reference to FIG. 3, the combined secondary/RF feed maintains provisions for fine adjustment of the secondary mirror position and angle 9b, independent of the primary structure 1, to enable optimal optical alignment.

The secondary substrate/RF lens 2 preferably consists of a dielectric (glass or composite) material which is RF transparent, having minimal loss tangent but which is also fabricated with an optically precise outward (primary-facing) surface. The surface of the secondary substrate is preferably coated with a stacked dielectric thin-film layer 2b appropriate for highly efficient optical reflection in the range of wavelengths being transmitted and received. The substrate inner and outer curvatures are designed in conjunction with the RF feed horn 14 (see FIG. 2) in order to optimally illuminate/receive RF energy from the primary reflector 1. An RF transparent composite secondary support structure 9 links the secondary substrate/RF lens 2 with the RF feed horn 14 and three-strut support structure 5.

The combined secondary/RF feed also maintains provisions for fine adjustment 14b of the RF feed horn 14 position and alignment with respect to the primary reflector 1 for optimal RF performance. The feed horn 14 and circular polarizer 10 interface directly to the secondary support structure 9, which is coupled to the primary structure via the three strut supports 5. One strut of the three strut support 5 includes an RF cable 6 (See FIG. 1) or waveguide path for feeding the circular polarizer 10. For a two polarization design, a second strut would include a similar RF cable or waveguide path.

The vertex 7b (see FIG. 2) of the dual-band (optical/RF) antenna 200 addresses further aspects of the optical design. A divergent lens (not visible) located just behind the surface of the primary reflector 1 relays the optical beam to the secondary mirror 2b. A baffle 7a (see FIG. 2) extends past the surface of the primary reflector 1 as required by the optical design to prevent stray light from passing to the optical transceiver (not shown) behind the primary. The baffle 7a (see FIG. 2) material is preferably optically opaque and RF transparent so as to minimize any adverse effects on the RF performance.

Depending on the operating environment, an optical shroud 8 may be used to further shield the primary reflector 1 surface from unwanted thermal gradients due to direct sunlight illumination, for example. The shroud 8 material can be of the same type used for the central baffle 7a (see FIG. 2) or secondary support structure 9, having minimal effect on the RF performance.

4. Exemplary Applications

Applications of the invention include a dual-band communications terminal utilizing the microwave system as a backup to the optical link in the case of adverse weather. For space links, a microwave frequency in the Ka-band (~32 GHz) seems best suited to the design, providing considerable gain for the given aperture size, having beamwidth well-matched to a typical optical FOR, and representing the upper limit in frequency useful for cloud/weather backup.

Figure 4:
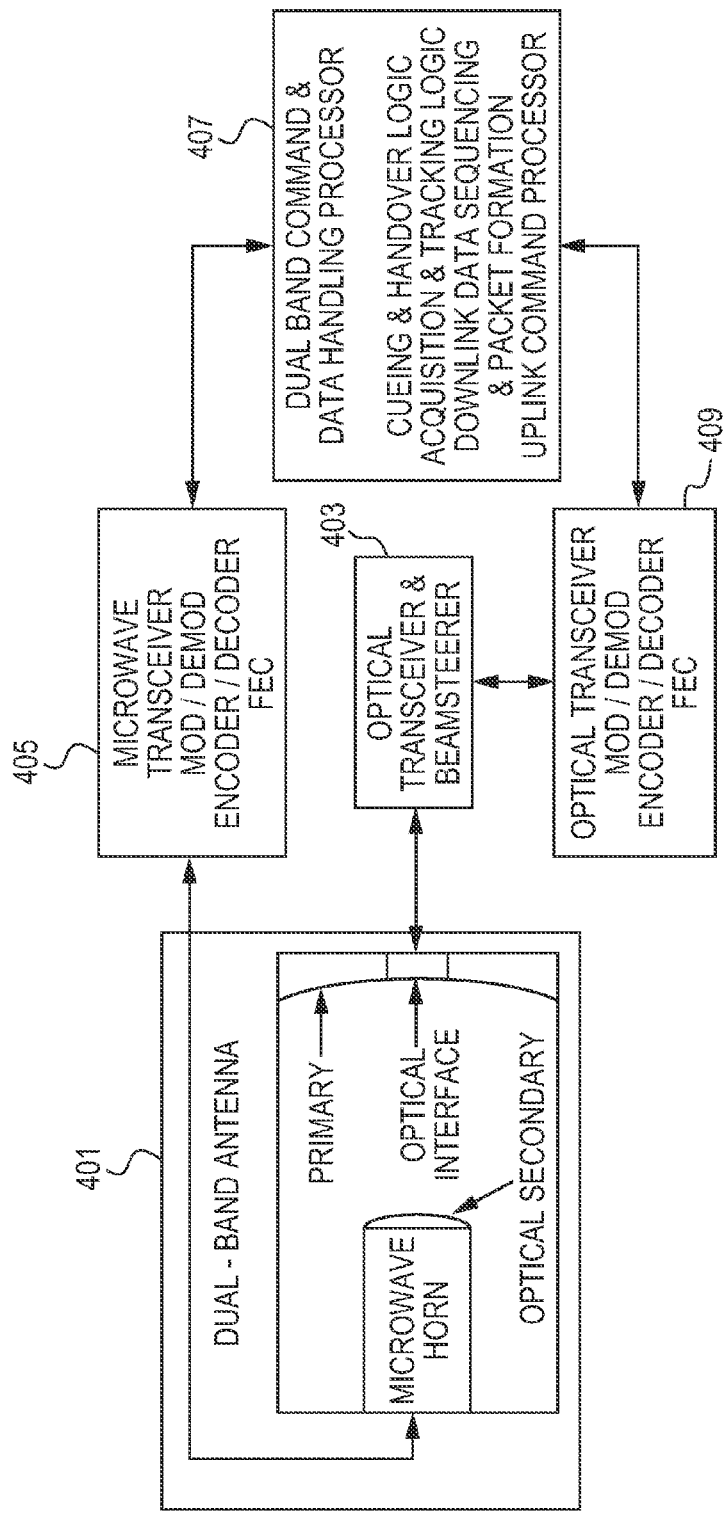
FIG. 4 is a functional block diagram of a dual-band antenna as part of a dual-band communications terminal according to one embodiment of the invention.

Referring now to FIG. 4, there is shown a system functional block diagram of a dual-band communication system including the dual-band antenna of the invention. The dual-band antenna 401 enables the simultaneous or complementary operation of the optical and RF channels by virtue of its unique optimized design as well as the operation of several functions highlighted in FIG. 4. An optical transceiver 403, including beamsteerer, would be positioned behind the vertex of the dual-band antenna. Both the RF (microwave or mm-wave) and optical channels require a modulator/demodulator, an encoder/decoder, and forward error correction coding (FEC) 405 & 409. The optical channel would likely be modulated using a M-ary pulse position modulation (PPM) type waveform, with M typically ranging from 2 to 128, for deep-space or other power-starved scenario. Alternatively, for links which can support it, direct on-off-keying (OOK) modulation may be used to achieve much higher data rates on the order of 1 Gbps and above.

The functions indicated in the block diagram that are unique to the dual-band system are those indicated in the command and data handling (C&DH) system 407. These include the dual-band command processor, i.e., cueing and handover logic for the RF channel or uplinked GPS data, respectively; acquisition and tracking logic for the optical channel; as well as downlink data sequencing and packet formation. The uplink command processor would include an ability to translate the uplink commands to spacecraft attitude control system (ACS) actuator commands based on the location of the spacecraft relative to the ground terminal (i.e., coordinate frame corrected ephemeris). RF cueing logic would be invoked if the initial acquisition is via an RF uplink or handover logic invoked if the ground terminal GPS position is uplinked.

Figure 5:
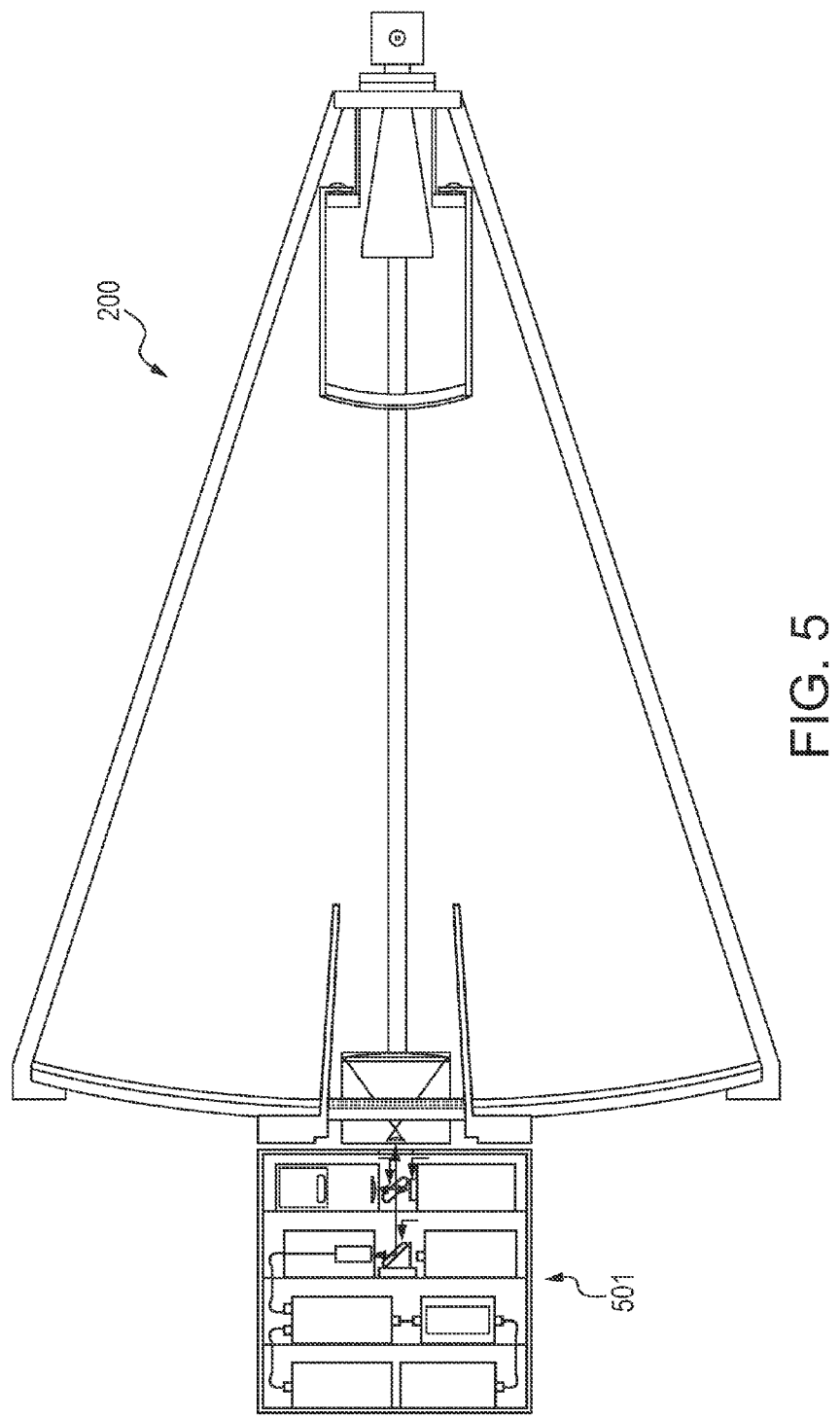
FIG. 5 is an exemplary illustration of an application of use of a dual-band antenna with an single-channel optical transceiver package behind the primary mirror according to one embodiment of the invention.

FIG. 5 shows one implementation of the dual-band antenna 200 of FIG. 2, shown coupled to a conventional single-channel optical communications transceiver package 501 on the backplane (behind the primary). This package uses an APD receiver detector with a piezoelectric or galvanometric beamsteerer and quadrant diode tracker.

Figure 6:
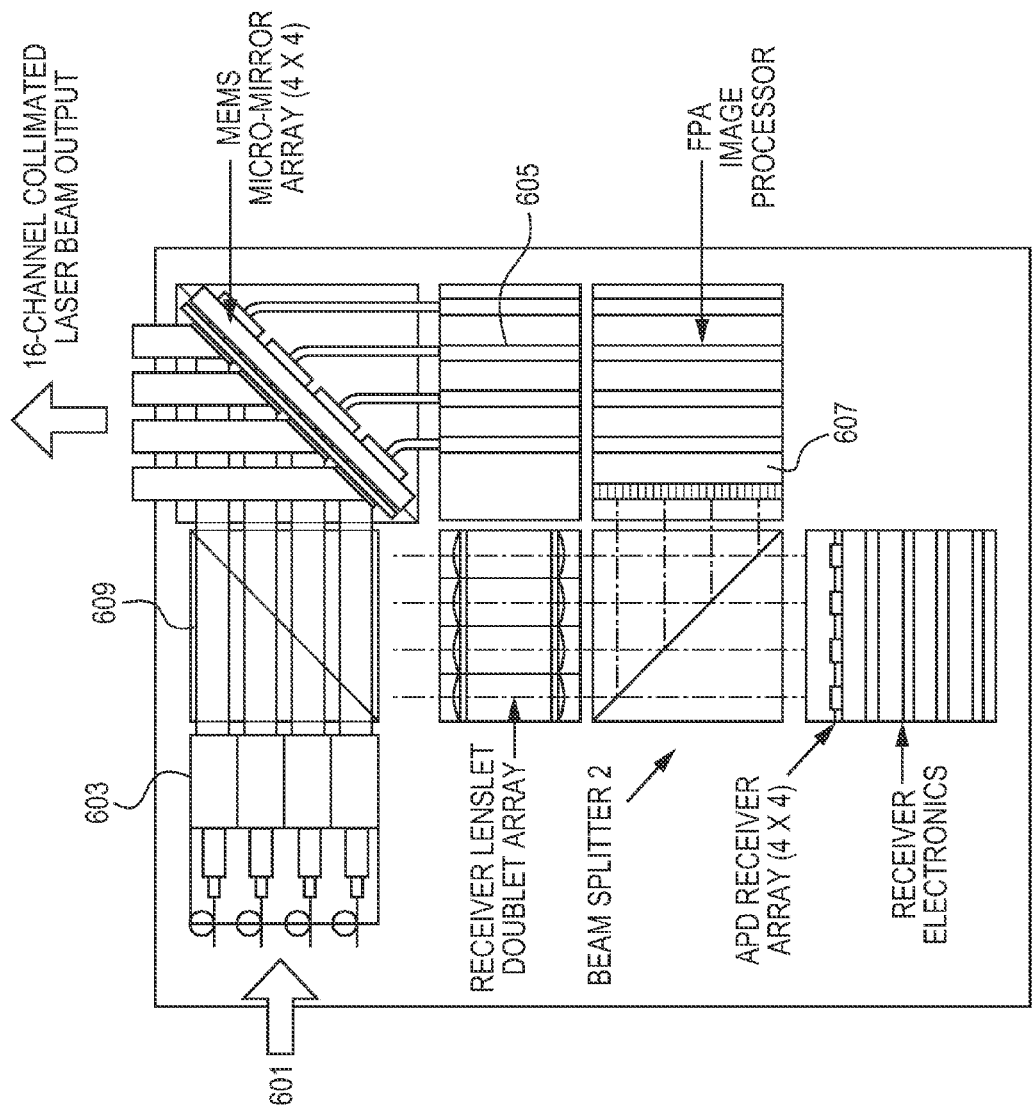
FIG. 6 is an exemplary illustration of a multi-channel optical transceiver with a CMOS tracker for use with a dual-band antenna according to one embodiment of the invention.

FIG. 6 shows in plan-view a multi-channel optical transceiver with a CMOS tracker, which can be directly-coupled to the backplane of the dual-band antenna of FIG. 5 without changing the RF design. This particular application consists of a 16 channel system, which employs 16 fiber-coupled laser inputs 601, which are individually modulated using pulse-position modulation (PPM), and a 16 channel micro-electro-mechanical systems (MEMS) micro-mirror array 605 for beamsteering. Both the modulator and laser sources may be remotely located and coupled to the transceiver head through fiber optic patch cords. Several laser sources are appropriate for use, depending on the operating range and link budget: laser diodes, micro-chip lasers, or fiber lasers. The more powerful the laser source the more likely it would be isolated from the transceiver head to enable more efficient heat sinking, thermal isolation, and control. The receiver utilizes an APD receiver array separate from the CMOS focal plane tracking array 607. The latter enables individual laser beam spot tracking for all 16 channels, while sharing each APD channel's field-of-view with each laser's angular pointing field. All 16 channels can be beam expanded through the optical Cassegrain part of the dual-band antenna. This enlarges the beam waist of each channel from the collimator 603 aperture diameter (~1 cm) up to the primary diameter (~10-30 cm) and will be diffraction-limited if the initial laser beam profiles are single-mode Gaussian, and all 16 beams are completely overlapped at the exit pupil. The actual laser beamwaist from each collimator would be ~3 mm, and the MEMS micro-mirror pitch would be ~4 mm, making the total exit beam array diameter about 16 mm). Since the dual-band antenna is a design constrained by both the optical and RF system requirements, the actual pitch may be scaled differently to accommodate this while still achieving the desired beam waist.

An alternative embodiment of the optical packaging would employ fiber optic beam splitters to eliminate free space losses in using two bulk beam-splitters (as shown 609. In either case the optical receiver detectors (APDs) would be operated at much higher bandwidths (e.g., 10-1000 Mbps data rates) than the CMOS tracking array (~100-500 Hz frame rates).

Figure 7:
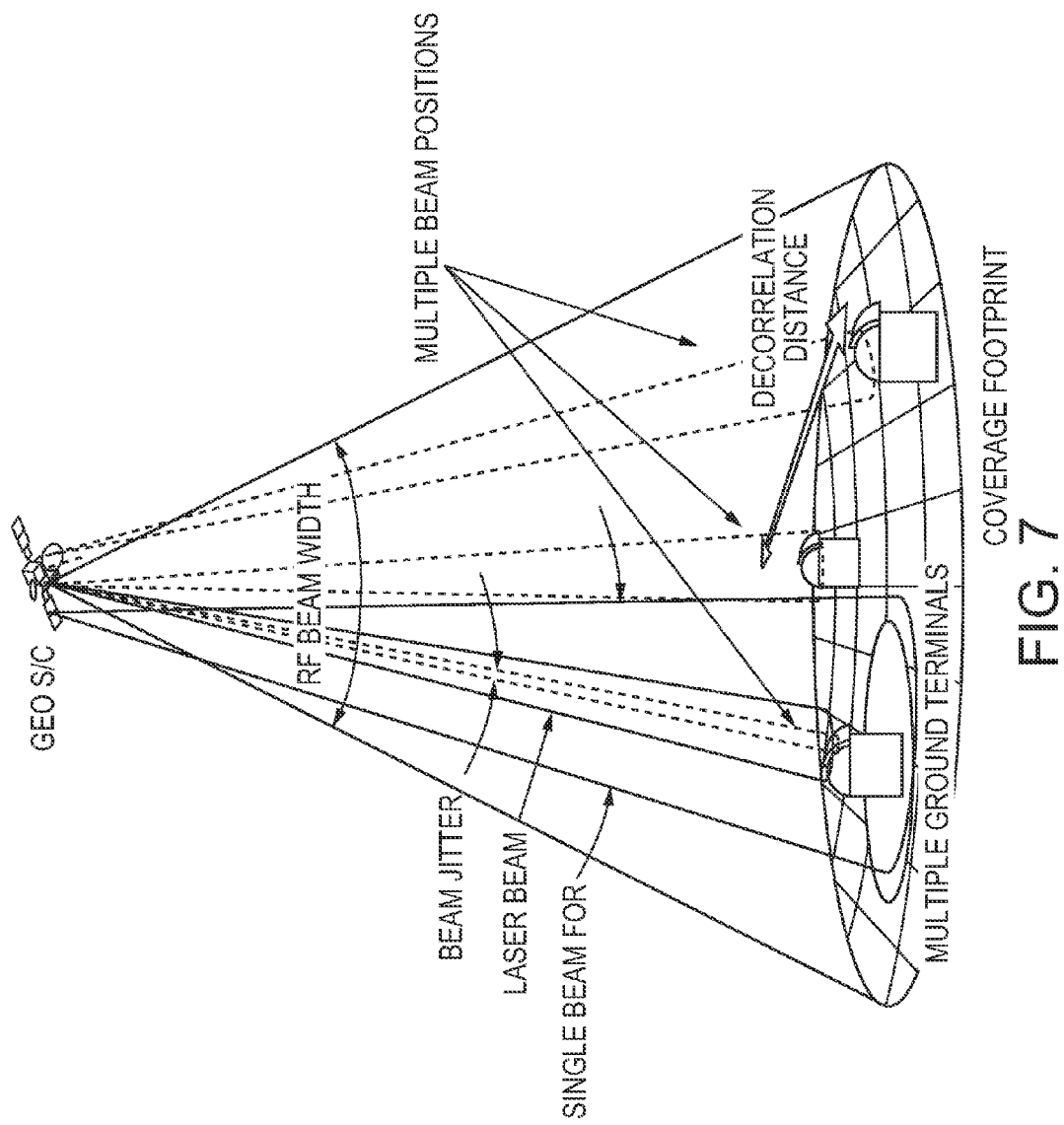
FIG. 7 is an exemplary illustration of a dual-band antenna in a multi-channel, dual-band space-to-ground communications infrastructure.

FIG. 7 illustrates a further embodiment utilizing the dual-band aperture of the invention. Through optical link analysis it has been established that data rates can approach or exceed 1 Gbps for the longer range case of a geosynchronous earth orbit (GEO) dual-band platform, which is the most desirable mode of operation from the standpoint of application utility because its time-on-station is essentially indefinite. Typical FEC gains can approach ~10 dB to help compensate for optical system inefficiencies, other implementation losses, and path losses due to fading and turbulence. From earth orbit to ground the slant path can vary from geosynchronous earth orbit (GEO) down to near earth orbit (NEO) with a substantial increase in angle off-nadir requirements and a decrease in time-on-station as the transmit platform goes from GEO down to NEO. This also changes the requirements somewhat on the optimal RF beamwidth and corresponding optical comms field-of-regard (FOR). For long ranges (i.e., GEO) the dual-band system can operate best because its pointing is essentially stationary except for relatively slight repointing required by weather-induced path losses or fades or ground site availability changes. For much closer ranges, i.e., NEO, much larger FORs are required, which would necessitate the use of multiple optical transceiver assemblies, gimbals, or highly divergent secondary optical elements to cover the expanded FOR.

For a direct nadir path from GEO to ground as depicted in FIG. 7 an appropriate FOR is ~1°, e.g., ~18 mrad, which covers ~650 km on the ground. Typical weather cells are approximately one-third of this. A weather cell is the distance over which weather decorrelates by ~1/e, so that over three cells weather is highly decorrelated. So if receive stations are placed apart by that distance, a cloud-free line-of-sight (CF-LOS) may be achievable at one location if not the other. At Ka-band the 3 dB mainlobe beamwidth will be necessarily much greater than 1° because the optimal antenna size is closer to ~30 cm ($\Rightarrow$ a Ka-band beamwidth of ~4°), but this provides more flexibility for total system operation. In an optical multi-channel transceiver implementation, the actual FOR [in rad] for each channel will be FOR/N [rad] where $N^2$ the total number of channels in a square array of optical beams. The beamwidth of these individual beams, if limited only by diffraction, will be set by the exit aperture of the dual-band antenna primary, which is ~8 μrad for a 30 cm aperture at 1 μm, which can even be slightly spoiled without severe link loss, e.g., increased to ~16 μrad, thus requiring a slightly relaxed pointing jitter error of ~5 μrad (jitter~beamwidth/e). To bring the typical laser beam waist up to the aperture size, a beam expansion ratio of ~100 is thus needed, which means that the laser beam divergence can be ~0.5 mrad, which is achievable with single-mode fiber optics coupled to industrial optical quality collimators. This also permits a 4×4 array of such collimators to fit well within the entrance pupil of the dual-band antenna, where the minimum array pitch is ~4 mm (i.e., an array ~16 mm across, the size of a typical focal plane array) coupled to a 30 cm (12 in) Cassegrain.

Dual-band system control logic on-board the spacecraft terminal would be employed for several functions, the two most critical being RF-to-optical handover and optical link acquisition. The former function can be enabled by providing to the space terminal an uplinked RF signal or GPS coordinates (as the source location) of the ground terminal. The latter function would be enabled by having each small lasercom receiver FOV dithered in angle within its own prescribed FOR (one of $N^2$ such FORs, within the RF mainlobe) to enable search and lock-on to a ground terminal (based on maximizing the received signal power or minimizing the associated bit error rate). The ground terminal would have to know the spacecraft ephemeris in order to point at the spacecraft, which should be rather easy given its GPS coordinates, time of day, and the fact that the spacecraft is a GEO orbit. Another means to cue the spacecraft downlink is have it look for a ground optical beacon (implemented either as a passive corner cube array or actively as a high duty-cycle high peak-power burst waveform), but this would be the mode of last resort, because the required ground terminal uplink power would be very high since any optical uplink suffers from significant angle dispersion due to turbulence, which is higher near the ground. In addition to handover functions two other functions would be needed: a composite track file to enable handover of one optical channel to another within the total FOR of the optical array (because the ground terminal may be moving), and an algorithm that would switch over to the RF mainbeam channel if all optical channels fade concurrently. In the former case a CMOS optical imaging tracker would be partitioned into $N^2$ sub-images to allow centroid tracking of individual optical channels, with a forward predictor-corrector algorithm to cue the next FOV. In the latter case, a real-time estimate of the bit error rate (BER) would cue the switch to an RF mode for data uplink or downlink, for instance when BER reaches a threshold of $10^{-6}$ or greater. Two other functions can also be implemented: interference rejection and authentication, which can work together. If a bright un-modulated light source (natural or artificial) is within the FOV, it must be suppressed, either spectrally by narrow-band filtering or via polarization rejection. (The best spectral rejection possible spectrally is to use an active atomic resonance filter.) Authentication is enabled with the appropriate encoding/decoding technique, which could be implemented in a manner similar to forward error correction, but would require a bit sequence unique to the ground transmitter that can be changed dynamically. Overall, the multi-channel implementation also allows angular rejection of adjacent ground sources attempting to jam or hijack the spacecraft receiver (as a form of electronic attack). The multiple channels just give a finer grade of controlling the receive path as well as allowing for two-source correlation or decorrelation to assist encryption or interference rejection. In this case both angle selection logic (essentially spatial multiplexing) and time domain signal discrimination techniques can be used to enhance signal security on transmit or receive.

5. Conclusion

It is therefore been shown that a dual-band antenna combines high bandwidth optical communications with RF backup/adjunct communications or RF navigational functionality in a single integrated antenna design for maximum efficiency in terms of mass and size. The disclosed dual-band antenna is realized by combining a front-end optical telescope with a compatible RF antenna design utilizing a shared, lightweight primary reflector. The antenna design is an axially symmetric co-boresighted design utilizing a direct-fed prime-focus system for the microwave component and a Cassegrain design for the optical component. The antenna design overcomes the two main challenges to implementing a dual-band optical/RF antenna for space, being the disparate nature of the two design regimes and the competing requirements for the highly precise optical surface quality components and the low mass necessary for space platforms. For long-haul space optical communications links, such as from a geosynchronous orbit to the ground, larger optical apertures are desirable, on the order of 25 cm, to minimize the spot size on the ground and thereby maximize the received signal. The necessarily larger aperture brings the design regimes, optical and RF, closer together, enabling the primary aperture size to be effectively shared between the two.

While the invention has been described with reference to an example embodiment, it will be understood by those skilled in the art that a variety of modifications, additions and deletions are within the scope of the invention, as defined by the following claims.

What is claimed is:

1. A common aperture dual-band antenna for optimally transmitting and receiving microwave and optical energy for high data-rate communications, the dual-band antenna comprising:
   (A) a shared portion comprising a primary reflector configured for focusing and reflecting said microwave and optical energy;
   (B) an optical portion in a largely Cassegrain configuration comprising:
      (i) an optical transceiver configured for high data rate transmission and laser beam pointing, acquisition and tracking, the optical transceiver further comprising: a laser source, an optical detector, a tracking detector array and a beam-steerer;
      (ii) an optical beam interface positioned substantially at a vertex of said dual-band antenna to facilitate integration the dual-band antenna with said optical transceiver;
      (iii) a dichroic secondary reflector configured for optical reflection and RF transmission;
      (iv) a dichroic vertex window configured for optical transmission and RF reflection;
      (v) an optical baffle positioned substantially between the primary reflector and the secondary reflector configured for shielding unwanted stray optical wave energy;
      (vi) a divergent lens positioned substantially at the vertex of the primary reflector and configured for transferring a collimated beam to the secondary reflector and for transferring an converging beam from the secondary to a collimated beam behind the vertex of the primary reflector;

(C) a microwave portion in a direct fed configuration comprising: a microwave feed assembly further comprising:
  (i) an RF feed horn located on a central axis of the apparatus to which all portions of said apparatus are co-aligned proximal to the focus of the primary reflector, said RF feed configured for optimally illuminating the primary reflector with microwave energy for transmission to a remote terminal and for receiving microwave energy from said remote terminal reflected from the primary reflector and focused to the RF feed horn;
  (ii) a circular polarizer interface for circularly polarizing RF energy transmitted from said RF feed horn to allow the arbitrary orientation of the terminal around its pointing vector while communicating with said remote terminal.

2. The apparatus of claim 1, further comprising a first adjustment mechanism for accurately aligning a secondary surface of said secondary reflector accurately with respect to a primary surface of said reflector to insure that said largely Cassegrain configuration acts like an afocal beam expander for the optical transceiver, thereby collimating the outgoing beam.

3. The apparatus of claim 1, further comprising a second adjustment mechanism for independently aligning the RF feed horn with respect to the primary reflector to insure proper illumination of the primary for maximum gain and boresight aligned with the optical beam.

4. The apparatus of claim 1, wherein said microwave feed assembly further comprises:
  an optical secondary support substrate for appropriately lensing RF energy transmitted from and received by said RF feed horn; and
  an RF-transparent cylindrical composite support structure for offsetting the RF feed horn from the optical secondary.

5. The apparatus of claim 4, further comprising: a stacked-dielectric surface coating on said optical secondary support substrate to achieve efficient optical reflection for a pre-defined range of transmitted and received wavelengths, thereby allowing for manageable RF transmission.

6. The apparatus of claim 5, wherein said RF-transmissive optical shroud has a substantially cylindrical shape and is coupled around the base of said primary reflector.

7. The apparatus of claim 1, further comprising an RF-transmissive optical shroud to shield a surface of the primary reflector from direct sunlight and unwanted thermal gradients.

8. The apparatus of claim 1, further comprising: mounting means for securing the secondary reflector and supporting RF cabling associated with the microwave feed assembly.

9. The apparatus of claim 8, wherein the mounting means further comprises a strut support for supporting a secondary structure of the combined secondary reflector and RF feed assembly.

10. The apparatus of claim 1, wherein the optical baffle extends from the primary surface near the vertex in a direction perpendicular to said primary reflector to effectively block substantially all off-axis scattered light without blocking light reaching the secondary reflector from an inner periphery of said primary reflector surrounding the vertex window.

11. The apparatus of claim 1, wherein said optical baffle is microwave transmissive.

12. The apparatus of claim 1, wherein the primary reflector has a substantially paraboloidal shape.

13. The apparatus of claim 1, wherein the primary reflector has a substantially spherical shape.

14. The apparatus of claim 1, wherein the secondary reflector has a substantially hyperboloidal shape.

15. The apparatus of claim 1, wherein the secondary reflector has a substantially oblate ellipsoidal shape.

16. A communications terminal, comprising:
(1) a common aperture dual-band antenna for optimally transmitting and receiving microwave and optical energy for high data-rate communications, the dual-band antenna comprising:
  (A) a shared portion comprising a primary reflector configured for focusing and reflecting said microwave and optical energy;
  (B) an optical portion in a largely Cassegrain configuration comprising:
    (i) an optical transceiver configured for high data rate transmission and laser beam pointing, acquisition and tracking, the optical transceiver further comprising: a laser source, an optical detector, a tracking detector array and a beam-steerer;
    (ii) an optical beam interface positioned substantially at a vertex of said dual-band antenna to facilitate integration the dual-band antenna with said optical transceiver;
    (iii) a dichroic secondary reflector configured for optical reflection and RF transmission;
    (iv) a dichroic vertex window configured for optical transmission and RF reflection;
    (v) an optical baffle positioned substantially between the primary reflector and the secondary reflector configured for shielding unwanted stray optical wave energy;
    (vi) a divergent lens positioned substantially at the vertex of the primary reflector and configured for transferring a collimated beam to the secondary reflector and for transferring an converging beam from the secondary to a collimated beam behind the vertex of the primary reflector;
  (C) a microwave portion
    (i) an RF feed horn located on a central axis of the apparatus to which all portions are co-aligned proximal to the focus of the primary reflector, said RF feed configured for optimally illuminating the primary reflector with microwave energy for transmission to a remote terminal and for receiving microwave energy from said remote terminal reflected from the primary reflector and focused to the RF feed horn;
    (ii) a circular polarizer interface for circularly polarizing RF energy transmitted from said RF feed horn to allow the arbitrary orientation of the terminal around its pointing vector while communicating with said remote terminal; and
(2) transceiver logic configured for modulating a transmitted laser beam from said laser source and further configured for demodulating a received laser beam;
(3) an encoder and decoder for converting digital data to a protected modulation waveform for authentication; and
(4) forward error correction code to compensate for implementation losses, atmospheric propagation losses, and pointing and tracking errors.

17. A multi-channel communications terminal comprising: a common aperture dual-band antenna for optimally transmitting and receiving microwave and optical energy for high data-rate communications, the dual-band antenna further comprising:
- (A) a shared portion comprising a primary reflector configured for focusing and reflecting said microwave and optical energy;
- (B) an optical portion in a largely Cassegrain configuration comprising:
  - (i) a multi-channel optical transceiver/tracker further comprising: a multiple receiver detector array, and a multiply sub-windowed CMOS tracking array, said multi-channel optical transceiver/tracker optical transceiver configured for high data rate transmission and laser beam pointing, acquisition and tracking;
  - (ii) an optical beam interface positioned substantially at a vertex of said dual-band antenna to facilitate integration the dual-band antenna with said optical transceiver;
  - (iii) a dichroic secondary reflector configured for optical reflection and RF transmission;
  - (iv) a dichroic vertex window configured for optical transmission and RF reflection;
  - (v) an optical baffle positioned substantially between the primary reflector and the secondary reflector configured for shielding unwanted stray optical wave energy;
  - (v) a divergent lens positioned substantially at the vertex of the primary reflector and configured for transferring a collimated beam to the secondary reflector and for transferring an converging beam from the secondary to a collimated beam behind the vertex of the primary reflector;
- (C) a microwave portion
  - (i) an RF feed horn located on a central axis of the apparatus to which all portions of said apparatus are co-aligned proximal to the focus of the primary reflector, said RF feed configured for optimally illuminating the primary reflector with microwave energy for transmission to a remote terminal and for receiving microwave energy from said remote terminal reflected from the primary reflector and focused to the RF feed horn; and
  - (ii) a circular polarizer interface for circularly polarizing RF energy transmitted from said RF feed horn to allow the arbitrary orientation of the terminal around its pointing vector while communicating with said remote terminal.

18. The multi-channel communications terminal of claim 17, wherein the laser source enables one of simultaneous or sequential access to multiple optical beams, consistent with cueing provided by one of the multi-channel optical transceiver/tracker or an uplinked GPS beacon for a remote terminal.

19. The multi-channel communications terminal of claim 17, wherein the multi-channel optical transceiver/tracker is configured in one of a square or hexagonal close-packed geometry.

20. The multi-channel communications terminal of claim 17, further comprising a beam distribution train, said beam distribution train further comprising:
  - (a) a first dichroic beamsplitter for transmitting substantially all outgoing beamlet power at a transmit wavelength from said apparatus and for reflecting incoming beamlet power at a different wavelength to a receiving lenslet array
  - (b) a MEMS micromirror array that reflects and steers each of said outgoing and/or incoming beamlets,
  - (c) a second beamsplitter for coupling at least one received beam to the optical transceiver/tracker; and
  - (d) a receiver lenslet array for coupling the at least one received beam to a corresponding detector of said multiple receiver detector array as well as to the CMOS tracking array that is partitioned into an equal number of sub-areas that track each of said at least one received beam.

21. The multi-channel communications terminal of claim 17, further comprising:
  a command and data handling module further comprising:
    cueing, handover, acquisition and tracking logic to maintain link and handle channel transitions within the communications terminal or between it and a separate remote communications terminal; and
    data sequencing and packet formation, and uplinked commands.

* * * * *